Oct. 19, 1937. E. HASSIG 2,096,489
ROTARY CUTTING TOOL
Filed Dec. 22, 1936

Inventor
Edward Hassig
By Wheeler, Wheeler & Wheeler
Attorneys.

Patented Oct. 19, 1937

2,096,489

UNITED STATES PATENT OFFICE 2,096,489

ROTARY CUTTING TOOL

Edward Hassig, Milwaukee, Wis., assignor to Wetmore Reamer Company, Milwaukee, Wis., a corporation of Wisconsin Application December 22, 1936, Serial No. 117,178

11 Claims. (Cl. 77—58)

This invention relates to improvements in rotary cutting tools, with particular reference to boring bars.

It is the object of the invention to provide novel and improved means for positioning and guiding a tool and tool holder in the body of a boring bar or the like, with provision for micrometric adjustment and for clamping pressure which is effective independently of the adjusting screw.

More specifically, objects of the invention include the provision of a novel organization permitting the assembly of a tool carrier and adjusting screw in a boring bar for advancing and retracting feed under micrometric control, the assembly of the tool carrier and screw being such as to maintain the screw fixed in a socket of the boring bar without any extraneous securing devices. It is also my purpose to provide a novel association of the calibrated head of the adjusting screw with the periphery of the boring bar.

In the drawing.

Like parts are identified by the same reference characters throughout the several views.

Figure 1:
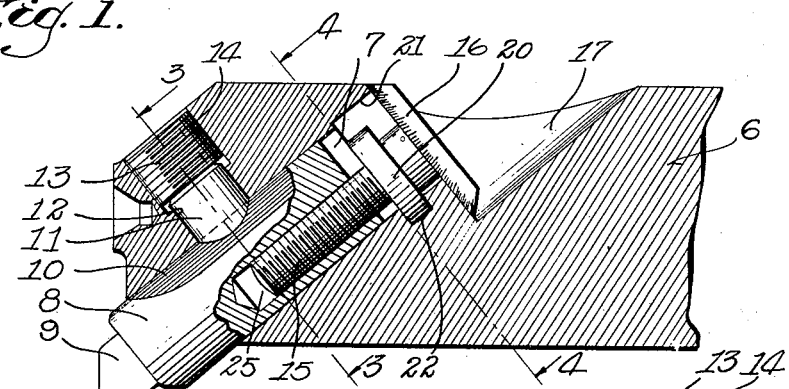
Figure 1 is an axial section through a tool assembly embodying this invention, portions of the part hereinafter designated as a tool carrier being broken away to expose the adjusting screw.

A boring bar or other spindle 6 is provided at 7 with a diagonally inclined bore for the tool carrier 8. While it is broadly immaterial to the invention whether the cylindrical part 8 shall of itself comprise a cutting tool, I have, in accordance with general practice, shown the cylinder 8 as constituting a tool carrier having a separate cutting tip or tool at 9. It will be understood to be within the contemplation of the invention that these parts may be made in one piece if desired.

The side of the otherwise cylindrical tool carrier 8 has oppositely beveled bearing surfaces constituting a saddle portion 10 engaged by the clamping pressure of the complementary end of a thrust block 11 guided in the bore 12 at right angles to bore 7 and subject to the pressure of an adjusting screw 13 in the threaded counterbore 14. When the screw is turned down to force the bifurcated clamping block 11 into firm contact with the saddle portion 10 of the tool carrier 8, the tool carrier may be frictionally bound in any position of adjustment.

In order to provide for the micrometric control of the position of the tool, a screw 15 with a calibrated head 16 is used as means for adjusting the tool carrier 8 inwardly and outwardly in the bore 7. A socket 17 co-axial with bore 7 receives the calibrated head 16 of the adjusting screw, the diameter and bevel of the head being such that its upper surface will be just flush with the periphery of the bar to co-act with a conventional fixed calibration line (not shown).

Figure 3:
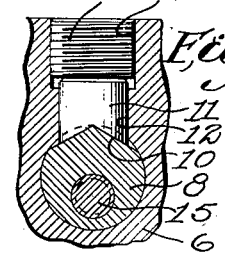
Figure 3 is a detail view taken in section on the line 3—3 of Figure 1.
Figure 4:
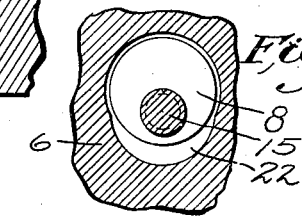
Figure 4 is a detail view taken in section on line 4—4 of Figure 1.

In order that the screw may exert thrust in the tool carrier 8 in both directions it is, of course, necessary to fix the screw against axial displacement in the bar. It is therefore provided with a thrust collar 20 which is just receivable into the counterbore 21 when the screw is co-axial with bore 7. At the bottom of this counterbore I provide an eccentric recess 22 which exactly corresponds in radius and thickness with the collar 20 to receive the collar when the screw is moved to an eccentric position in bore 7 as shown in Figs. 1, 3, and 4.

Figure 2:
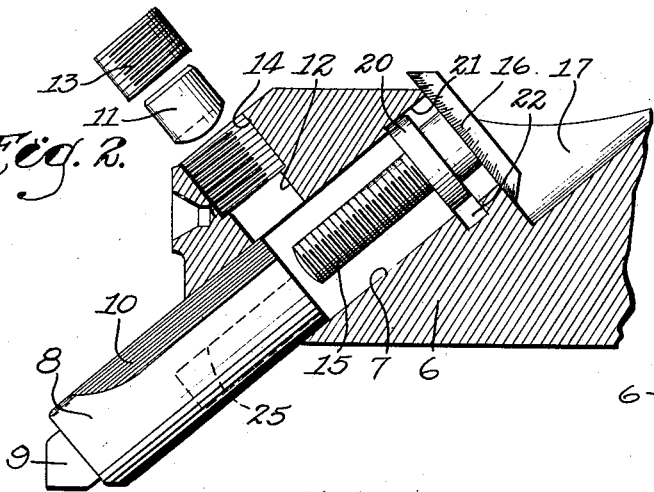
Figure 2 is a view similar to Figure 1 showing the parts as they appear when only partially assembled.

The threaded socket 25 in which the screw is engaged in the tool carrier 8 is eccentrically located in the tool carrier so that the screw will only be aligned therewith and receivable therein when the thrust collar 20 is fully seated in the recess 22, at which time the calibrated adjusting head 16 of the screw will be flush with the surface of the bar or body 6. Thus the parts may readily be assembled in the manner suggested in Fig. 2, but when the thrust collar has once been seated in the recess 22 and has been turned to engage screw 15 to a progressively greater depth in the socket 25 of the tool carrier, the result of the interaction of the tool carrier with the screw is such that the screw is confined in its eccentric position and cannot be released without first disengaging it from the tool carrier.

The tool carrier in turn is not only clamped with the bifurcated portion of the thrust block 11, but, even when such thrust block is relatively loose, it serves to restrain the otherwise cylindrical tool carrier against rotation in bore 7. Thus the several parts co-act not only to maintain the tool 9 in its properly aligned angular position, but also to maintain the tool carrier against rotation and thereby to prevent it from cramping in the bore 7 along which it is adjusted by screw 15. As above noted, the tool carrier in turn holds the screw in an eccentric location in which the thrust collar 20 of the screw is firmly seated in recess 22 to resist any axial movement of the screw in either direction and thereby to provide for positively absorbing the thrust of the screw in order that the tool carrier may accurately respond to the manipulation of the calibrated head 16.

Figure 5:
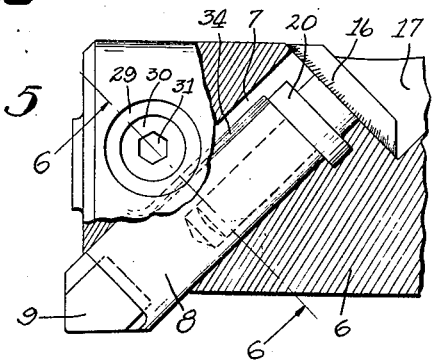
Figure 5 is a sectional view similar to Fig. 1 showing a modified tool assembly.
Figure 6:
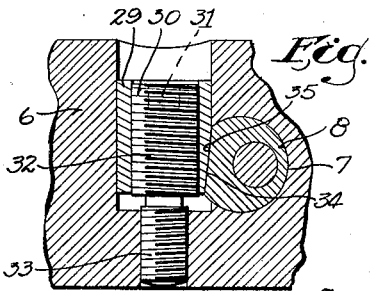
Figure 6 is a detail view taken in section on the line 6—6 of Fig. 5.

The same advantages are secured in the modified construction shown in Figs. 5 and 6, wherein the boring bar or spindle 6 is provided with a transverse bore at 28 for the thrust block 29. The thrust block is movable in bore 28 across the tool carrier 8 instead of to and from the tool carrier. Its movement is controlled by screw 30 which has a central recess at 31 engageable with a wrench. The larger portion 32 of the screw which is engaged in the thrust block 29, and the smaller portion 33 of the screw which is threaded into the body of the bar have oppositely pitched right and left hand threads respectively, so that by rotating the screw it is possible to feed the block 29 positively in either direction.

The thrust block 29 has a beveled surface at 34 which serves as a wedge to engage the complementary plane beveled surface 35 of the tool carrier 8. It has been found that even a light pressure on the block 29 is sufficient to wedge the tool carrier rigidly in position to maintain its adjustment. When the clamping pressure is released the pressure block 29 will still remain in a position such that the complementary flat surfaces 34 and 35 will prevent the tool carrier 8 from rotating in its bore 7. The adjustment of the pressure block is somewhat similar to the disclosure in the co-pending application of Joseph W. Schmidt entitled "Blade anchoring wedge", Serial No. 113,324, filed November 30, 1936.

I claim:

1. A device of the character described comprising the combination with a body portion and a tool assembly having a bore and an under-cut recess opening thereto, of a tool carrier reciprocable in the bore and provided with an eccentric threaded opening, of an adjusting screw engaged in said opening and having a collar seated in said recess.

2. In a device of the character described, the combination with the body portion of a tool assembly having a bore and an under-cut recess opening thereto, of a screw having a collar receivable into the end of the bore when said screw is centered therewith, said collar being positioned in said recess against displacement axially of the bore when the screw is off center, and a tool carrier reciprocable in the bore and having an off center threaded connection with said screw, whereby said carrier maintains said collar in said recess and said collar fixes the position of said screw for the reciprocation of said carrier.

3. In a device of the character described, the combination with the body portion of a tool assembly providing a guideway having an under-cut recess adjacent one end, of a screw positioned off center in said guideway with an anchorage portion seated in said recess, and a tool carrier reciprocable in said guideway in threaded engagement with said screw to be controlled thereby, the point of said engagement being such as to maintain said anchorage portion in said recess.

4. In a device of the character described, the combination with a body having an obliquely transverse bore and a pocket on one side of said body in which said bore terminates, and an under-cut recess opening from said bore, of a screw having a head disposed in said pocket and a collar spaced from said head and receivable into an end of said bore when said screw is co-axial with the bore, said collar being seated in said recess and said screw being displaced laterally from the axis of the bore, and tool adjusting means in threaded connection with the screw and reciprocable in said bore, said means maintaining said screw in its offset position.

5. In a device of the character described, the combination with a body having a bore and an under-cut recess opening from said bore, of a screw having a collar receivable into an end of the bore when the screw is co-axial therewith, said collar being seated in said recess and said screw being offset laterally from the axis of the bore, a tool adjusting device reciprocable in the bore and provided with an off-center socket with which the screw is in threaded engagement, whereby to maintain said screw off-center and to provide for the transmission of motion from the screw to the carrier, and means for maintaining said carrier against rotation in said bore.

6. In a device of the character described, the combination with a body having a bore and an under-cut recess opening from said bore, of a screw having a collar receivable into an end of the bore when the screw is co-axial therewith, said collar being seated in said recess and said screw being offset laterally from the axis of the bore, a tool adjusting device reciprocable in the bore and provided with an off-center socket with which the screw is in threaded engagement, whereby to maintain said screw off-center and to provide for the transmission of motion from the screw to the carrier, and means for maintaining said carrier against rotation in said bore, the bore being oblique with reference to the body and the body having a pocket, the screw being provided with a head disposed in the pocket and beveled to register at its periphery with the periphery of the body at the side of the pocket.

7. In a device of the character described, the combination with a body having a bore and an under-cut recess opening from said bore, of a screw having a collar receivable into an end of the bore when the screw is co-axial therewith, said collar being seated in said recess and said screw being offset laterally from the axis of the bore, a tool carrier reciprocable in the bore and provided with an off-center socket with which the screw is in threaded engagement, whereby to maintain the screw off-center and to provide for the transmission of motion from the screw to the carrier, and clamping means reciprocable in the body into engagement with said carrier to fix the position thereof, said clamping means and carrier having co-active surfaces non-concentric with the axis of the bore, whereby to restrain said carrier against rotation in the bore.

8. In a device of the character described, the combination with a body having a bore and an under-cut recess opening from said bore, of a screw having a collar receivable into an end of the bore when the screw is co-axial therewith, said collar being seated in said recess and said screw being offset laterally from the axis of the bore, a tool carrier reciprocable in the bore and provided with an off-center socket with which the screw is in threaded engagement, whereby to maintain the screw off-center and to provide for the transmission of motion from the screw to the carrier, and clamping means reciprocable in the body into engagement with said carrier to fix the position thereof, said clamping means and carrier having co-active surfaces nonconcentric with the axis of the bore, whereby to restrain said carrier against rotation in the bore, said clamping means comprising a wedge adjustable transversely of the path of movement of said carrier and provided with a screw connected with the wedge and with said body for fixing the position of the wedge.

9. A device of the character described comprising a body having a bore, a cylindrical tool carrier reciprocable in the bore and beveled to provide a saddle portion, said body having an opening communicating with said bore at the location of said saddle portion, a bifurcated pressure block slidable in said opening, and a screw threaded to said body above said pressure block and adjustable to maintain said block in releasable clamping engagement with the saddle portion of said tool carrier, said block being bifurcated to secure said carrier against rotation in its bore when said tool carrier is slidably adjusted in said bore upon release of said clamping pressure.

10. In a boring bar or the like, the combination with a bar having an oblique bore adjacent its end and an under-cut recess opening into said bore and a pocket in which said bore terminates and an opening substantially at right angles to said bore, of a screw provided with a collar seated in said recess, the screw being off center with respect to said bore and said collar being removable from said recess and said bore when said screw is in axial alignment with said bore, a tool carrier reciprocable in the bore and having an off center threaded connection with the screw and provided with a longitudinally extending saddle portion beneath said opening, a bifurcated block fixed in said opening and engaging said saddle portion to comprise a guide securing said carrier against rotation, a plug screw-threaded to said body in said opening and adjustable to force said block into clamping engagement with the saddle portion of the tool carrier, and a calibrated screw head mounted on said screw and disposed within the pocket and provided with a peripheral portion substantially flush at its outer periphery with the periphery of said body.

11. In a device of the character described, the combination with a body having an obliquely transverse bore and a pocket of larger radius than said bore on one side of the body in which said bore terminates, of a tool carrier fitted for reciprocation in said bore, means adjustable in said body for positioning said carrier, and a screw for the adjustment of said carrier in said bore, said screw having an enlarged head disposed within the said pocket and peripherally bevelled on a radius and at an angle such that the bevelled surface of the head on the open side of the pocket is substantially flush with the side of said body, said body and said screw having portions interlocked to fix said screw against axial displacement during the rotation of said screw for the adjustment of said carrier.

EDWARD HASSIG.